Sept. 14, 1937.  F. H. KROGER  2,092,762
VARIABLE CONDENSER FOR MODULATION
Filed March 19, 1935
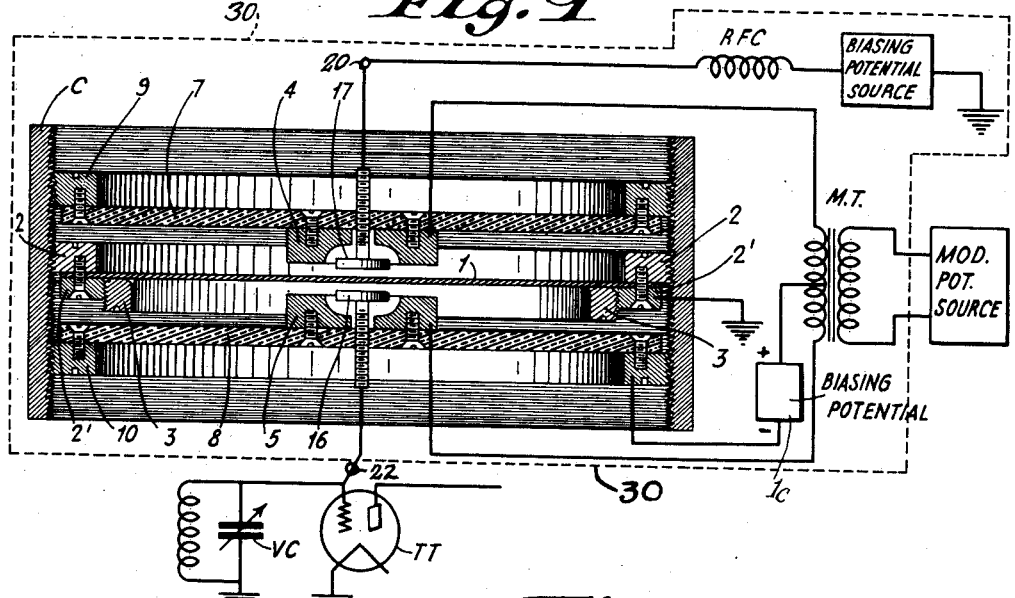
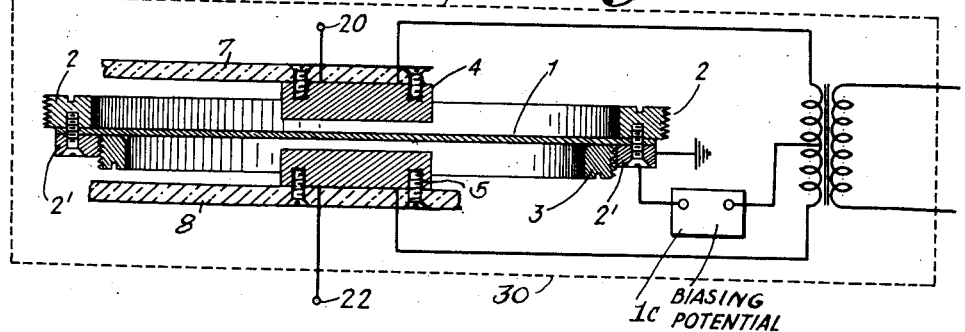
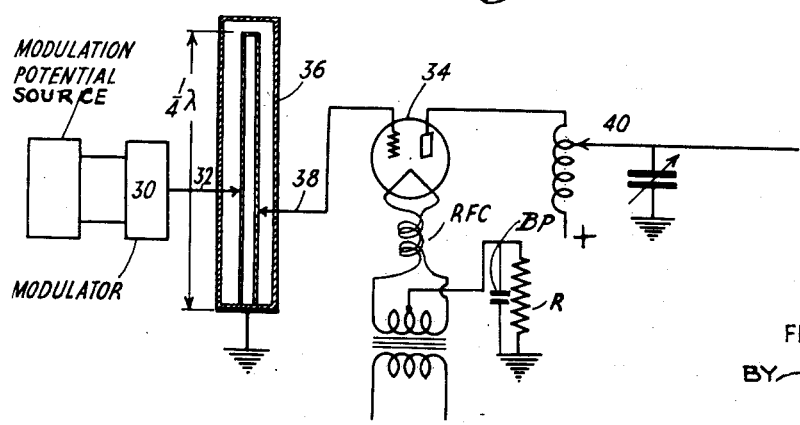
INVENTOR
FRED H. KROGER
BY
ATTORNEY Patented Sept. 14, 1937

2,092,762

UNITED STATES PATENT OFFICE 2,092,762

VARIABLE CONDENSER FOR MODULATION

Fred H. Kroger, Port Jefferson, N. Y., assignor to Radio Corporation of America, a corporation of Delaware Application March 19, 1935, Serial No. 11,772

10 Claims. (Cl. 179—171)

This invention relates to novel variable condenser and to the same in a novel circuit for producing frequency modulation of high frequency or ultra high frequency waves.

In some cases, it is desired to use frequency modulation as a method of communication, instead of amplitude modulation of the energy radiated by a radio transmitter with a short wave length of the order of, say five meters. Methods have been devised requiring an appreciable addition of apparatus to that required for amplitude modulation, as for example by phase modulation of the first stage and adding successive stages of frequency multiplying and amplitude limiting to obtain the required frequency modulation.

Systems have been known heretofore for producing frequency modulation by varying the resultant capacity or inductance of an element in a frequency determining circuit. In said systems, however, to vary the capacity or inductance in a prescribed manner and of a sufficient amount has involved mechanical difficulties in that disproportionality between the impressed modulating potentials and the radiating modulating wave results. For example, in known condenser microphones a large variation of capacity produces no linear modulation because the variation of the capacity of the microphone, if large, is not linear with respect to the modulating potential causing said variations. If the variable condenser is in parallel with additional fixed condensers, the variable condenser must be a small percentage of the fixed condenser for linearity and then the linearity contained in the variable condenser will result in linear modulation.

An object of the present invention is to provide a novel and simple means for producing capacity variations of a considerable range which are directly proportional to the modulating potentials producing said capacity variations. These capacity variations then, if utilized in a frequency determining circuit, will produce linear frequency modulation of a wave of said circuit.

An additional object of the present invention is to provide a new and improved circuit arrangement in which the novel condenser of the present invention is included and by means of which linear frequency modulation of high frequency or ultra high frequency waves may be impressed.

The novel features of my invention have been pointed out with particularity in the attached claims. The nature of my invention and the manner in which the same operates will be understood from the following detailed description thereof and therefrom when read in connection with the drawing, in which:

Fig. 1 shows, for purposes of illustration, a variable condenser the elements of which are arranged in accordance with the present invention. The condenser is shown as being connected to a relay of the thermionic type, in which oscillations may be produced or produced oscillations may be relayed;

Fig. 2 shows a modification of the arrangement of Fig. 1; while

Fig. 3 shows a preferred form of circuit arrangement in which the capacity varying means of the prior figures is represented as a rectangle and is utilized to accomplish frequency modulation of short wave.

Referring to Fig. 1 of the drawing, the numeral 1 indicates a diaphragm which may be made of any material, but is preferably of duralumin, and is quite thin. 2 and 2' are supporting rings between which the diaphragm 1 is clamped by means of screws, as shown. The ring 2 may be threaded as shown within a cylindrical casing C. In order to obtain the desired natural period for the diaphragm 1, a tensioning ring 3 may be threaded on the inner periphery of the ring 2' and forced against the diaphragm 1 to the extent necessary to obtain the desired natural period for the diaphragm. 4 and 5 are actuating plates which are perforated at the center and recessed as shown. These plates 4 and 5 may be supported by means of screws on insulated supporting members 7 and 8. The members 7 and 8 may be in turn supported on threaded rings 9 and 10, threaded within the outer casing C, as shown. The assembly as described is arranged as described to protect the diaphragm and its associated operating arrangements from the elements and from dirt and dust.

16 is a plate electrode of a variable condenser which may be connected in any radio frequency circuit for control purposes. The condenser plate 16 may be supported on a rod threaded into the member 8. The plate 16, with the diaphragm 1, constitutes the electrodes of a variable condenser and as shown, the plate 16 may be varied relative to the diaphragm 1 to thereby vary the minimum and maximum values of the condenser formed by varying the air gap or distance between 1 and 16. An electrode 17, similar to the electrode 16, is adjustably supported by the insulating member 7. The electrode 16 may be connected in parallel with variable capacity VC connected with the control grid of a thermionic tube TT which may operate as an amplifier or an oscillator. The electrode 17 may be connected as shown by way of a radio frequency choke coil RFC to a source of biasing potential which applies a balancing voltage to the electrode 17 to compensate the potential applied to the electrode 16, due to its connection with the circuit VC. The control potentials may be supplied to the actuating plates 4 and 5 symmetrically from any source of controlling potentials for example, the electrodes 4 and 5 may be connected as shown to the secondary winding and a modulation frequency transformer MT which in turn may be connected with any source of modulating potentials. The modulating transformer MT may be of a type adapted to transform potentials of audible frequency or of subaudible frequency in cases where the modulating potentials are supplied on a carrier wave.

Polarizing potentials are supplied from a source connected as shown between the electrical center of the secondary winding of MT and the ring 10, which is in turn conductively connected by the casing C to the ring 2 and the diaphragm 1 and to ground. Thus, the diaphragm 1 is symmetrically biased relative to the plates 4 and 5 and is maintained at ground potential relative to the radio frequency potentials and to the modulating potentials. This is an important feature, since symmetry and stability of operation is ensured.

When there is no modulating potentials or voltage applied from MT to the rings 4 and 5 and when a biasing potential is supplied to the electrode 17 of such a value as to balance the radio frequency voltage occurring on 16, then the diaphragm 1 will be in its neutral position. The bias 1c on 4 and 5 applies equal forces to 1 in opposite directions.

When a signal voltage of instantaneous value 1s is applied to the members 4 and 5, we then have unbalanced forces on 1. Since the force on 1 is independent of the polarity of the voltage applied and proportional to the voltage squared, we have the following equations representative of the forces on 1. In these equations, 1c represents the balanced bias applied to the members 4 and 5 by the biasing source connected with the secondary of MT, 1s represents the applied signal potential, and F represents the forces applied to 1.

(1) F due to (4) = $(1s+1c)^2$
(2) F due to (5) = $(1s-1c)^2$
(3) Resultant F on (1) = $(1s+1c)^2 - (1s-1c)^2$
$= 1s^2 + 2(1s1c) + 1c^2 - 1s^2$
$\qquad + 2(1s1c) - 1c^2$
$= 4\ 1s1c$ Thus, it is seen that the amount of force and therefore resulting capacity change is proportional to the signal independent of the ratio 1s/1c. The diaphragm 1 being in a neutral position independent of the value of 1c when 1s equals 0, there is minimum distortion due to displacement of diaphragm.

The resulting linear variations of capacity obtained as indicated above may be applied as shown to the control grid of a thermionic tube TT in which carrier waves may be produced or amplified to obtain linear frequency modulation thereof. As will be seen, the capacity between 16 and 1 is in parallel with the frequency determining capacity VC.

A simplified modification of the arrangement has been shown in Fig. 2. In Fig. 2, the casing C, the supporting rings 9, 10 and the supporting members 7 and 8 have been omitted. The rings 2 and 2' have been shown. Also, the diaphragm 1 and the tensioning ring 3. In the modification of Fig. 2, the plates 4 and 5 may be supported as in Fig. 1. The plates 4 and 5, however, are directly coupled to the diaphragm 1. The biasing potential which neutralizes the effect of the radio frequency voltage may be supplied by means similar to that shown in Fig. 1 to a point 20, which is in turn connected to 4. The useful capacity variations may be supplied from a point 22, which may be connected with a frequency controlling element in a thermionic tube, as in Fig. 1. The arrangement of Fig. 2 in other respects is similar to the arrangement of Fig. 1.

The condenser of the present invention may be utilized in any high frequency or ultra high frequency circuit. For example, the variable condenser of the present invention may be utilized to replace the modulators in the ultra high frequency modulating circuits disclosed in Lindenblad's U. S. application Ser. No. 13,886, filed March 30, 1935. A preferable circuit has been shown in Fig. 3, wherein the modulator elements of Figs. 1 and 2, enclosed in the dashed lines, are represented diagrammatically by the rectangle 30. The variations in capacity produced in 30 may be supplied to an electrode in a high frequency generator 34 for control purposes. Preferably, the capacity variations are applied to a frequency determining circuit 36 comprising a quarter-wave length line of the type disclosed in said aforementioned application. The line is in turn connected by a lead 38 to a control electrode in the tube 34. The cathode of the tube 34 may be heated in any manner, but is preferably heated by a circuit as shown which includes means RFC for maintaining the cathode above ground radio frequency potential. Biasing potential for the control electrode of 34 may be supplied by means of a biasing resistance R shunted by a radio frequency bypass condenser BC connecting the electrical center of the cathode of the tube to ground. The resultant modulated wave may be supplied from the output circuit 40.

What is claimed is:

1. A substantially linear variable condenser comprising, a cylindrical member, a ring member supported within said cylindrical member, a diaphragm mounted on said ring member, a tensioning member adjacent said diaphragm, said tensioning member being supported by said ring member and arranged for movement along the axis of said cylindrical member, a pair of supporting members within said cylindrical member, there being a supporting member on each side of said diaphragm, and an electrode adjustably supported in each of said pair of supporting members.

2. A substantially linear variable condenser comprising a cylindrical member, a ring member mounted within said cylindrical member, a diaphragm mounted on said ring member, a tensioning member adjacent said diaphragm, said tensioning member being mounted for movement relative to said diaphragm along the axis of said cylindrical member, a pair of supporting members within said cylindrical member, there being a supporting member on each side of said diaphragm, a plate member supported on each of said pair of supporting members, and an electrode adjustably supported in each of said pair of supporting members.

3. A substantially linear variable condenser comprising a cylindrical member threaded on its inner periphery, a ring member threaded within said cylindrical member, a diaphragm mounted on said ring member, a tensioning member adjacent said diaphragm, said tensioning member being threaded on a ring supported by said first named ring for movement along the axis of said cylindrical member, a pair of supporting members threaded within said cylindrical member, there being a supporting member on each side of said diaphragm, a plate member supported on each of said pair of supporting members, and an electrode adjustably supported in each of said pair of supporting members.

4. In a frequency modulator, a circuit in which carrier wave oscillations are set up, a movable conductive member, a plurality of fixed electrodes mounted adjacent said movable member, at least one of said fixed electrodes forming with said movable member a reactance which is variable, a source of modulating potentials, means connecting points of different potential on said modulating potential source to said fixed electrodes and a point intermediate said aforesaid points to said movable member, and a second circuit connecting one of said electrodes and said conductive member to different points on said first named circuit.

5. In a frequency modulator, a circuit in which carrier wave oscillations are set up, a movable conductive member, a plurality of fixed members mounted adjacent said movable member, one of said fixed members forming with said movable member a reactance which is variable, an electrode mounted adjacent said movable member, a source of modulating potentials connected with said electrode and said movable member, a source of biasing potential connected to the other of said fixed members, and a connection between said one of said fixed members and a point on said circuit.

6. In a frequency modulator, a circuit in which carrier wave oscillations are set up, a movable diaphragm, electrodes adjacent said diaphragm, a modulation circuit connected in phase opposition with said electrodes to produce potential differences between said electrodes and said diaphragm to thereby produce relative movement between said electrodes and said diaphragm, and a second circuit applying electrical changes characteristic of the movements of said diaphragm to said first named circuit.

7. In a frequency modulator, a circuit in which carrier wave oscillations are set up, a movable conductive member mounted in a support, a tensioning member adjacent said movable conductive member, means for adjusting said tensioning member relative to said movable member, a support on each side of said movable member, an electrode mounted on each support, means for connecting one of said electrodes to a point on said circuit, means for connecting said movable member to a point on said circuit a biasing circuit connected with the other of said electrodes for setting up a potential thereon to counteract the potentials of carrier wave frequency on said one electrode, and means for setting up potentials which vary at signal frequency on said electrodes to thereby vary the capacity between said electrodes and said movable member.

8. In a frequency modulator, a thermionic oscillation generator having an input electrode connected with a frequency determining circuit and output electrodes connected with an output circuit, means for modulating the oscillations produced in said generator comprising a cylindrical member threaded on its inner periphery, a diaphragm supported on a ring threaded in said cylinder, a tensioning member mounted for axial movement in said cylinder adjacent said diaphragm, a support threaded in said cylinder on each side of said diaphragm, an electrode mounted on each of said supports, a source of modulating potentials, a transformer having a primary winding coupled to said source of modulating potentials, a connection between the terminals of the secondary winding of said transformer and said electrodes, a connection between said diaphragm and a point intermediate the terminals of the secondary winding of said transformer, whereby variations in the distance between said electrodes and said diaphragm are produced at signal frequency when said transformer is energized, and means for applying the capacity variations produced by said variations in distance between one of said electrodes and said diaphragm to the circuits connected between the input electrodes of said oscillation generator tube.

9. In means for producing capacity changes in an alternating current circuit which are proportional to signal voltages to thereby control the character of alternating current set up in said circuit, a movable member, a pair of fixed members on opposite sides of said movable member, a source of signal voltages, means for applying said signal voltages in phase opposition to said fixed members, means for connecting one of said fixed members to said alternating current circuit, means for connecting said movable member to said alternating current circuit and means for applying to the other of said fixed members a potential sufficient to produce an effect on said movable member equivalent to the effect produced on said movable member by the alternating current set up in said alternating current circuit to which said one of said fixed members is connected.

10. A signalling system comprising in combination, a condenser having a plurality of fixed plates and a plate which is movable relative to said fixed plates, a high frequency circuit in which high frequency currents flows connected to one of said fixed plates and said movable plate, current in said high frequency circuit tending to move said movable plate relative to said fixed plates, a circuit including a source of polarizing potentials connected to said movable plate and a fixed plate to provide a force which counteracts the tendency of said movable plate to move relative to said fixed plates because of said high frequency current flowing in said high frequency circuit, a source of variable signal voltages, and biasing means connecting said source of variable signal voltages to said movable plate and to a pair of said fixed plates to produce movement of said movable plate relative to said fixed plates to thereby vary the capacity between said movable plate and said one of said fixed plates and consequently the tune of said high frequency circuit in accordance with said signal voltages.

FRED H. KROGER.